(No Model.)
H. CLAY.
UNDERGROUND CONDUIT FOR ELECTRIC WIRES.
No. 275,023. Patented Apr. 3, 1883.
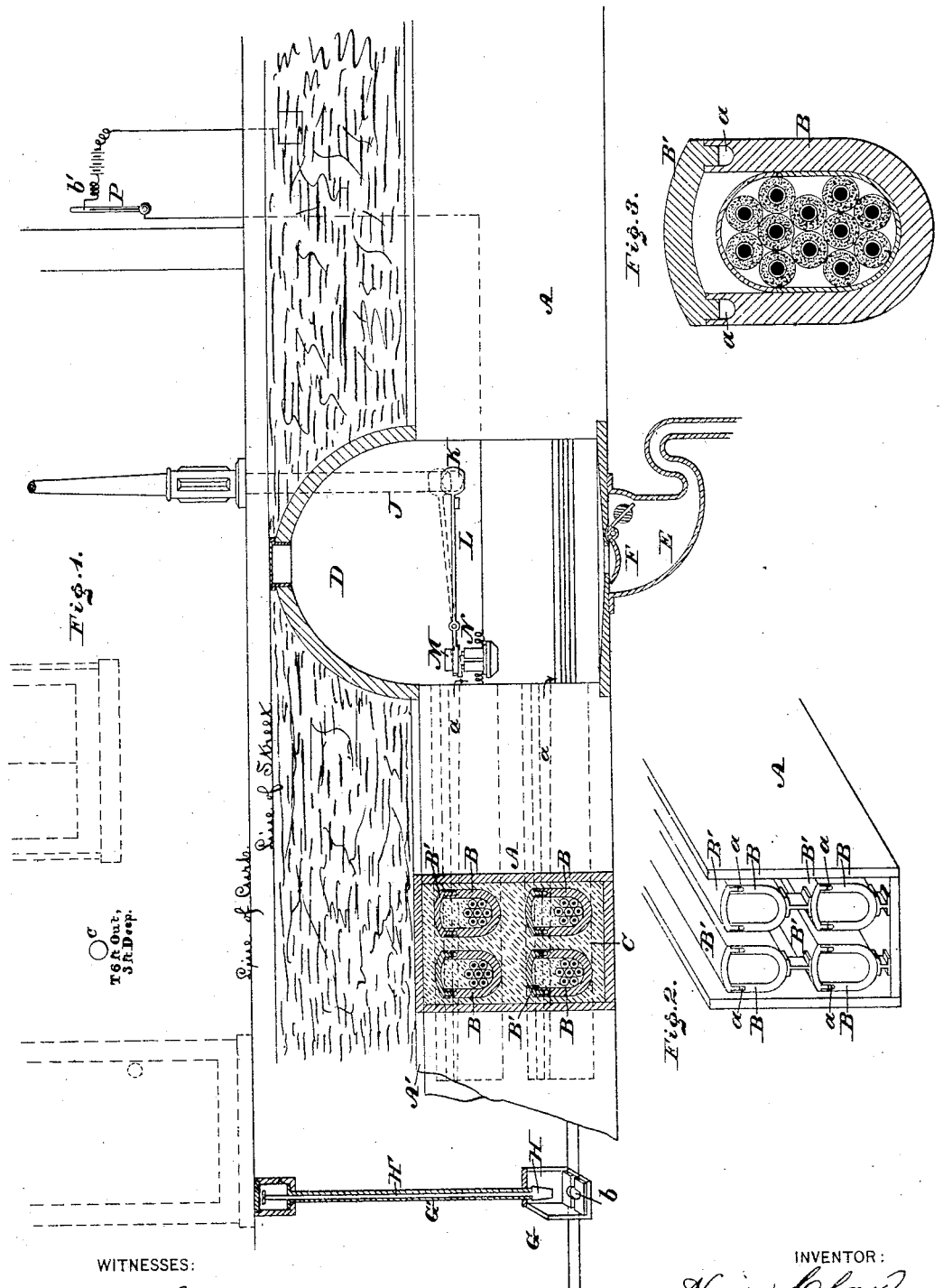
WITNESSES:
A. P. Grant
W. F. Kircher
INVENTOR:
Henry Clay,
BY John A. Wiedersheim
ATTORNEY.

UNITED STATES PATENT OFFICE.

HENRY CLAY, OF PHILADELPHIA, PENNSYLVANIA, ASSIGNOR OF ONE HALF TO J. BERNARD APPLE, OF SAME PLACE.

UNDERGROUND CONDUIT FOR ELECTRIC WIRES.

SPECIFICATION forming part of Letters Patent No. 275,023, dated April 3, 1883.

Application filed October 9, 1882. (No model.)

*To all whom it may concern:*

Be it known that I, HENRY CLAY, a citizen of the United States, residing in the city and county of Philadelphia, State of Pennsylvania, have invented a new and useful Improvement in Underground Conduits for Electric Wires, which improvement is fully set forth in the following specification and accompanying drawings, in which—

Figure 1 is a side elevation, partly broken away, of the underground conduit and appurtenances embodying my invention. Fig. 2 is a perspective view of a portion of the conduit. Fig. 3 is an enlarged sectional view of one of the troughs detached.

Similar letters of reference indicate corresponding parts in the several figures.

My invention consists of improvements in underground conduits for electric wires, embodying a box or tube which is preservatively coated or treated, wire-receiving troughs of peculiar construction, a filling in the box for covering the troughs, insulating material for the wires, a cut-off for the electric current in cases of accident, a testing-station with an automatically-operated ventilator-valve, and other details, as will be hereinafter fully set forth.

Referring to the drawings, A represents a box formed of wood, which is coated with a suitable preservative compound, or otherwise treated, whereby it is rendered durable; but it may be made of other proper material, so as to withstand the injurious action of the earth within which it is laid.

B represents troughs which are inclosed by the box A, and contain the electric wires, said troughs being arranged in series or tiers and separated one from the other, and each is provided with a closing-cap, B'. The space within the box between the troughs is filled with a composition of coal-tar, sand or gravel, and a drier, which becomes hard and completely incloses the troughs, its nature being such that it is impervious to water and is not affected by acids with which it may come in contact, whereby the troughs are effectively protected on their exterior, and may be cut into at any point without injury to surrounding portions of the filling. The boxes are placed end to end and connected or coupled, as many being employed as the length of the route or line requires, the troughs successively located, wires laid in the troughs, and the caps or covers B' fitted in position. The composition above described is then poured into the box, thus enveloping the troughs, as has been stated, and making a continuous jointless conduit. The box has suitable branches, C, or T's, at intervals, whereby provision is made for making communications with the sidewalk, street, houses, &c., and the top of the box has a lid, A', which may be removed when access is required to the troughs or interior of the box from above. The tops of the troughs B are formed with channels $a$, which extend in an inclined direction and open into the testing station or vault D, the object of the inclined channels being to direct moisture or water accidentally entering said channels to the testing-station, so that it discharges thereinto. The bottom of the testing-station has an outlet pipe or trap, E, which is provided with a valve, F, which opens by the weight of water entering the station, and automatically closes after discharge of the water, by which means water is not permitted to lodge in the station, and vermin are prevented entering the same.

G represents a device for cutting out from buildings, in cases of accidents, &c., electric-light wires which are directed to said buildings, the same consisting of two metallic plates in the length of the wires, horizontally arranged and properly separated, the center of the inner face of which has an opening, $b$, the two openings forming one opening for the reception of a plug, H, which is connected with a spindle, H', the handle whereof is conveniently accessible at the surface of the pavement, said spindle passing through insulating material in a tube, G', the handle of the spindle being also insulated to prevent accidents when it is grasped for operating the plug, the insulation of the spindle preventing leakage of the electric current to the ground by the spindle coming in contact with the ground.

It will be seen that when the plug H is raised the electric current will pass through the plates, as usual, and when said plug is lowered it comes in contact with the two plates, whereby the current is cut out from the building, &c., with which one plate is connected, and is directed by the plug to the other plate, which is grounded, or with which the ground-wire or other side of the loop is connected, thus disconnecting or cutting out the station or instrument in the building or elsewhere.

The testing station or vault is provided with a pipe, J, which opens into the atmosphere, or a lamp-post, as desired. The place of communication of said pipe with the testing-station is occupied by a valve, K, which is connected with a lever, L, which is suitably mounted on the testing-station, said valve K being adapted to cover and uncover said pipe J.

To the end of the lever L, opposite to the valve K, is secured an armature, M, the magnet N therefor being properly supported in the testing-station and in electric communication with a thermostat, P, which is fixed in a suitable position in a house or other locality along the route of the conduit, the magnets of the several testing-stations of the route being also in communication by means of suitable wires. The wire $b'$ of the thermostat, with which the column of mercury is to come in contact, and thus close the circuit, is placed or set at a height relatively to the temperature at which it is desirable that the testing-station should be ventilated. When the pipe J is closed by the valve K the armature M is not in contact with the magnet N. When the temperature above ground rises, the column of mercury reaches the wire $b'$ and closes the circuit, whereby the armature M is attracted by the magnet, and, moving toward the same, carries with it the valve K, thus uncovering the pipe J and causing the ventilation of the testing-station. When the temperature lowers, the column of mercury leaves the wire $b'$, thus breaking the circuit, whereby the armature and connected lever return to their normal position, thereby moving the valve over the opening of the pipe J and closing the same.

In order to insulate the wires the fibrous or other covering is incased in a metallic composition—such as black-lead, plumbago, carbon, or other suitable material—applied in a plastic state and afterward hardening, thus providing reliable insulation for the wires and means for carrying off or lessening the induced currents.

For the purpose of indicating the positions of the branches or T's, I mark on houses, the curbs, sidewalk, or other suitable localities, indicators $c$, announcing the position of the branches, as to their depth and distance from the houses, &c., whereby they may be readily found, and the street need not be disturbed at any other place than that directly over the branches.

The devices for cutting any particular house out of circuit may form the subject of another application.

Having thus described my invention, what I claim as new, and desire to secure by Letters Patent, is—

1. The exterior box, in combination with interior wire-receiving conduits formed of troughs provided with closing-caps, and an incasing composition consisting of coal-tar, sand or gravel, and a drier, substantially as and for the purpose set forth.

2. The conduits provided with closing-caps, and having channels $a$, which extend in inclined directions, substantially as and for the purpose set forth.

3. The testing-station provided with a ventilating-pipe, and a valve therefor automatically operated by the closing and breaking of circuits through the medium of a thermostat.

HENRY CLAY.

Witnesses:
JOHN A. WIEDERSHEIM,
A. P. GRANT.